Patented Dec. 5, 1950

2,532,369

UNITED STATES PATENT OFFICE 2,532,369

SYNTHETIC WAXLIKE MATERIALS

Joseph C. Patrick, St. Petersburg, Fla., and Franklin O. Davis, Trenton, N. J., assignors to Thiokol Corporation, Trenton, N. J., a corporation of Delaware No Drawing. Application July 24, 1947, Serial No. 763,436

12 Claims. (Cl. 260—608)

This invention relates to the production of synthetic wax-like materials obtained by a reaction involving dihalogenated organic compounds and certain special kinds of alkaline sulfides. The products of the reaction are definitely wax-like in character resembling in appearance high-grade natural waxes as, for example, carnauba wax, beeswax, montan wax, etc. However, the products have a number of improved properties inasmuch as they are not only insoluble in water, but are also insoluble in alkaline solutions and insoluble or difficultly soluble in numerous organic solvents, including alcohol, acetone, volatile hydrocarbons, and halogenated hydrocarbons. Moreover, many of the properties of the product can be controllably varied to suit different requirements. For example, the melting point, hardness, viscosity of the melted product can all be varied through a rather wide range. Moreover, a variety of colors can be imparted to the waxes not by merely mixing pigments or dyes physically therewith, but by actually incorporating the chromophoric group in the polymer which is built up by the chemical reaction.

As is now well known, products of a rubbery nature can be made by the reaction of alkaline polysulfides on di- or polyhalogenated organic compounds. The reaction of alkaline monosulfides with halogenated alkaline compounds has also been described. For example, if ethylene dichloride is reacted with sodium monosulfide a harshly granular product is obtained which is neither rubbery nor waxy. When it is heated, it does not melt but merely softens somewhat and undergoes decomposition if sufficient heat is applied.

To illustrate the novelty and unexpected results obtained by the present invention, the following may be noted in addition to what has been said before. If a mixture of ethylene dichloride and propylene dichloride be reacted with an alkaline monosulfide, e. g., $Na_2S$, the product is similar to that obtained by the reaction of ethylene dichloride with $Na_2S$ except that instead of a homogeneous product it is heterogeneous and consists not only of the above-mentioned granular ethylene monosulfide polymer but also a rather bad smelling propylene monosulfide oily polymer. If the same mixture be reacted with an alkaline sulfide having the formula $Na_2S_{1.15}$ or a sulfide in which the rank is higher than 1.15, that is 1.15 to 6.00, then a rubbery product is obtained. On the other hand, by slightly changing the composition of the sulfide and otherwise observing the conditions hereinafter stated, the same mixture produces a product of vastly different properties, that is, a product which is definitely wax-like.

The conditions which it is preferable to observe to obtain the synthetic waxes of the present invention may be summarized as follows:

(1) The use of an alkaline polysulfide having the general formula $M_2S_{1.05 \text{ to } 1.13}$ where M is a cation in combination with sulfur and may be an alkali metal or ammonium or substituted ammonium.

(2) The alkaline sulfide is reacted with a mixture of dihalogenated organic compounds each of which has one halogen atom attached to each of two different methylene carbon atoms. The mixture may contain two or more specifically different dihalogenated organic compounds and a copolymer is obtained by the reaction of those compounds with the alkaline sulfide. If the reaction is carried out by reaction of this alkaline sulfide with a single dihalogenated organic compound, the wax is not obtained. It seems to be rather remarkable that at least two different dihalogenated organic compounds must be used. However, whatever the reason or theory may be, the fact remains that such is the case. It was not to be expected that such mixture would be required because in making rubbery compounds by reaction between alkaline polysulfide and dihalogenated compounds rubbery polymers are obtained not only by the reaction of an alkaline polysulfide with a single polyhalogenated organic compound, but also with a mixture of polyhalogenated compounds. Moreover, another unique characteristic of the invention is that at least one of the components of the mixture must be an alkylene dihalide as, for example, ethylene and propylene dichloride, 1, 3 dichlor propane and other hydrocarbon dihalides.

(3) There is no upper limit to the number of specifically different dihalogenated compounds that may be used in the mixture; that is, one may use 2, 3, 4, 5, 6, 7, 8, 9, 10, 11, 12, 13, 14, 15, 20 or more specifically different dihalogenated organic compounds, provided as previously stated there is at least one that is a hydrocarbon dihalide.

(4) The minimum mol percentage of the alkylene dihalide in the mixture should be from 60 to 95.

(5) The alkaline sulfide should be used in a certain excess which may be expressed by stating that the mol ratio of the alkaline sulfide to the reactants is preferred within the range of 1.02 to 1.20.

(6) The temperature of this reaction may vary from 25° C. to 250° C. and is preferably carried out between 60° C. and 100° C. to avoid use of pressure equipment.

The use of a chain stopper material may be employed and such chain stopper material may be made from organic compounds in general containing only one negative substituent capable of being split off by reaction with an alkaline sulfide, e. g., halogen, formate, acetate, acid sulfate, etc. Such compounds are illustrated by those shown in the following list ($x$ identifies said negative substituent):

Table I

R(CH$_2$)$_n$X
RCH$_2$S(CH$_2$)$_n$X

R represents alkyl, aryl and aralkyl groups in general. Those groups or radicals may also contain substituents such as —CN, —COOH, —NO$_2$. The radical R itself may be —CN, —COOH or —NO$_2$. $n$ may vary from 1 to 18, preferably 1 to 10.

R'O(C$_2$H$_4$O)$_n$CH$_2$X

R' represents hydrogen, alkyl, aryl or aralkyl radicals in general and those radicals may contain substituents such as —CN, —COOH, —NO$_2$. $n$ may vary from 1 to 18, perferably 1 to 10. R may also be hydrogen.

R"COX

R" represents alkyl, aryl or aralkyl groups in general. Those groups or radicals may contain substituents such as —CN, —COOH, —NO$_2$.

In addition to the above generic description, other compounds may be used illustrated by the following compounds:

HOCH$_2$CH$_2$X
HOCHCH$_2$X
   CH$_3$
HOCH$_2$CHCH$_2$X
      OH

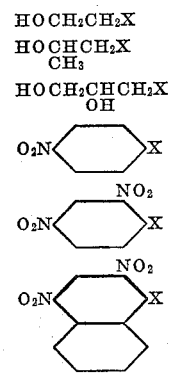

where X has the definition already given.

In using the above materials, they are first converted into the corresponding di- or polysulfides by reaction with an alkaline di- or polysulfide (or into the corresponding mercaptides, e. g., by reaction with an alkaline hydrosulfide) because otherwise they would be converted for the most part into the corresponding organic monosulfides or thio ethers which would not act as chain stoppers. The materials listed in Table I therefore represent those from which organic monomeric disulfides (containing a single disulfide —SS linkage) and unifunctional mercaptides (containing a single —SM group) may readily be obtained. From what has been said it will be apparent that organic disulfides in general (containing a single —SS linkage) and organic unifunctional mercaptides in general containing a single —SM group may be used and that it is those materials which constitute the effective chain stopping reagent.

Other examples of organic monomeric disulfides are as follows:

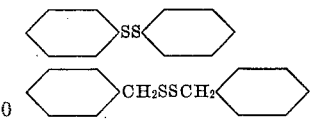

Examples of dihalogenated compounds that may be used are as follows:

Table II

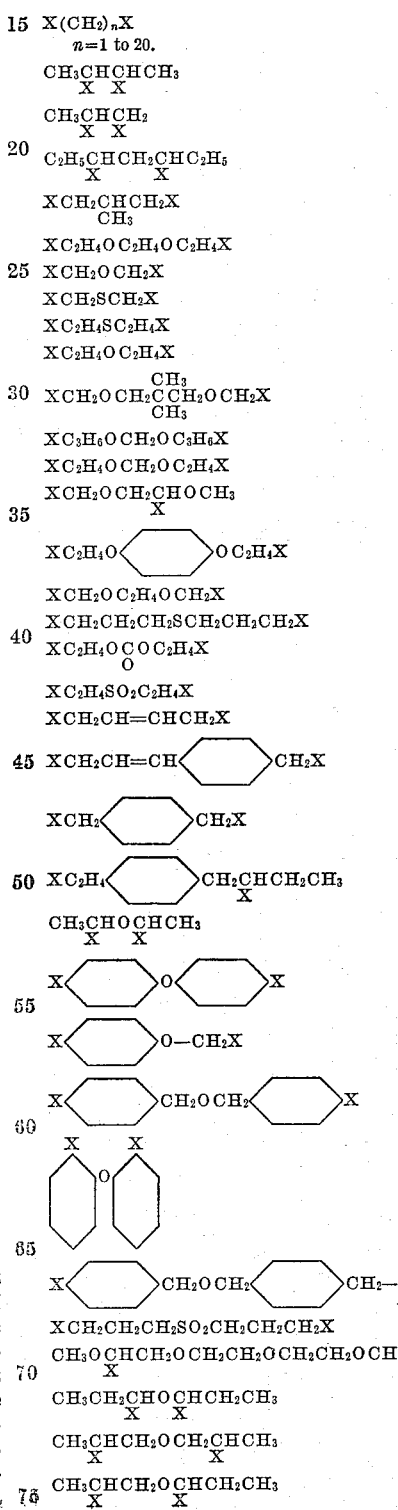

XCH₂CH₂CH₂OCHC₂H₅
         |
         X

CH₃CH₂CH₂CHOCHCH₂CH₂CH₃
          |   |
          X   X

C₂H₅CHCH₂OCH₂CHC₂H₅
    |           |
    X           X

CH₃CHC₂H₄OC₂H₄CHCH₃
   |          |
   X          X

XC₄H₈OC₄H₈X

XCH₂CHCH₂X
      |
     C₂H₅

XCH₂OCH₂CHOCH₃
          |
          X

XCH₂COCH₂CH₂OCCH₂X
    ‖            ‖
    O            O

XCH₂COCH₂CH₂CH₂OCCH₂X
    ‖              ‖
    O              O

XCH₂CH=CHCH₂CH₂X
XCH₂CH=CHCH₂CH₂CH₂X
XCH₂CH₂CH=CHCH₂CH₂CH₂X
XCH₂CH₂CH=CHCH₂CH₂X
XCH₂CH=CHCHCH₃
          |
          X

XCH₂CH₂CH=CHCH₂CHCH₃
                |
                CH₃

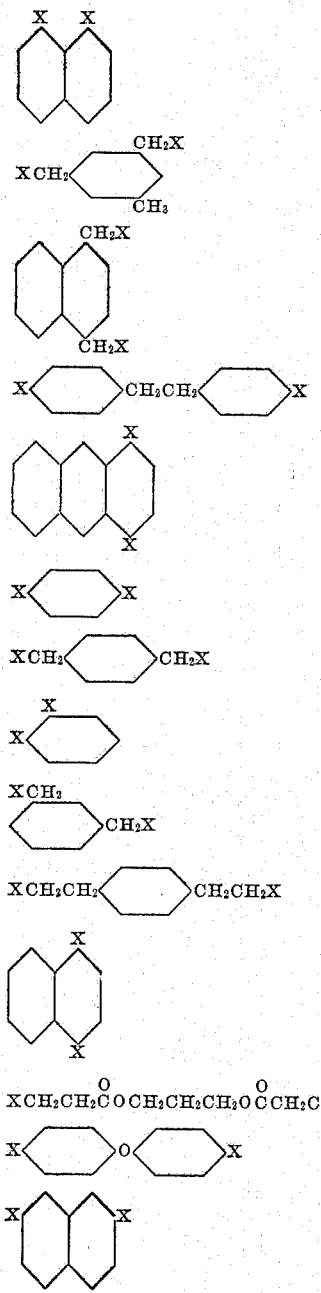

O                O
‖                ‖
XCH₂CH₂COCH₂CH₂CH₂OCCH₂CH₂X

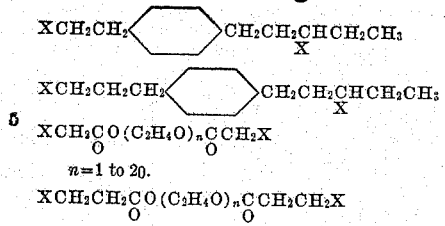

XCH₂CO(C₂H₄O)ₙCCH₂X
    ‖          ‖
    O          O n = 1 to 20.

XCH₂CH₂CO(C₂H₄O)ₙCCH₂CH₂X
       ‖              ‖
       O              O n = 1 to 20.

The above examples illustrate dihalogenated compounds having the general formula XRX where R is a divalent radical of the group consisting of aliphatic hydrocarbon, oxahydrocarbon and thiahydrocarbon radicals and araliphatic radicals in which the araliphatic portion is hydrocarbon and in which the aliphatic portions are selected from the group consisting of hydrocarbon and oxahydrocarbon radicals.

The invention will be further described by the following specific examples:

*Example 1*

2610 cc. of a solution containing 5.56 mols of $Na_2S_{1.12}$ was taken. This solution was made by mixing 250 cc. of a 2.24 molar solution of $Na_2S_{2.21}$ containing 0.56 mol of the latter with 2360 cc. of a 2.12 molar solution of $Na_2S_{1.0}$ containing 5.0 mols of the latter.

To this solution there was added a wetting agent which was sodium alkyl naphthalene sulfonate in the form of 20 cc. of a 5% aqueous solution of that wetting agent. There was also added 40 grams of crystallized magnesium chloride, having the formula $MgCl_2 \cdot 6H_2O$.

The solution was heated to about 150° F. and to it was gradually added over a period of about ninety minutes a mixture of ethylene dichloride and propylene dichloride, containing 4.5 mols of the former and 0.5 mol of the latter, making a total of 5.0 mols of the mixed dihalides, composed of 90 mol per cent of ethylene dichloride and 10 mol per cent of propylene dichloride.

The temperature rose to 190° F. during the addition of the halides, during which time a vigorous reaction occurred. The mixture was heated for about 90 minutes after the last of the halides had been added and the temperature of the reaction mixture finally reached a maximum of about 215° F.

The reaction product was obtained in the form of an aqueous dispersion or latex. This was washed several times, with intermediate settling and decantation of the wash water which separates from the latex, until free from excess sulfides. The resulting latex, having a pH of about 10.5, may then be treated with acid to adjust the pH to about 1.0. The adjustment may be made with any suitable acid, for example, sulfuric, hydrochloric, acetic, formic and the like, and has the effect of converting the magnesium hydroxide into a soluble magnesium salt. However the acidification step may be omitted. The product is in the form of particles dispersed in the aqueous serum and this is then treated to separate the particles from said solution or serum as, for example, by filtration. As filtered, the product is in the form of a wet pulverulent mass and is then treated to remove the water, for example, by drying.

The product has a melting point of about 204° F. When melted and cooled, it has a characteristic wax-like appearance somewhat similar to high grade waxes, such as carnauba wax and the like. However, the product has a unique behavior toward solvents. It is insoluble in water, alkalies and alkaline solutions, and is also insoluble or difficultly soluble in a number of organic solvents such as gasoline, benzol, alcohol, acetone, and halogenated hydrocarbons, and the like.

The following table shows how, by proceeding in accordance with Example 1, the properties of the product can be varied by varying the ratio of olefin halides and the ratio of other halides to olefin halides.

| Halides | Mol Percentage of Reactants | | | | | |
|---|---|---|---|---|---|---|
| Ethylene Dichloride | 70 | 70 | 80 | 80 | 90 | 90 |
| Di-2-chlorethyl formal | 30 | -- | 20 | -- | 10 | -- |
| Triglycoldichloride | -- | 30 | -- | 20 | -- | 10 |
| Melting Point, °F | 158 | 194 | 202 | 204 | 242 | 227 |

*Example 2*

In this example, benzyl chloride (illustrating an organic compound containing only one negative substituent capable of being split off by reaction with an alkaline sulfide) is first reacted with $Na_2S_2$ (illustrating an alkaline disulfide) to give benzyl disulfide (illustrating an organic monomeric disulfide). This is then reacted with $Na_2S$ (illustrating an alkaline monosulfide) to produce a reaction product containing a mercaptide and an alkaline polysulfide and corresponding in effective sulfur content or "rank" to a definite or selected molar quantity, e. g., 1 mol of an alkaline polysulfide having the empirical formula $M_2S_{1.05\ to\ 1.13}$ where M is a cation of the group consisting of ammonium and alkali metals and S is sulfur. In the particular example the "rank" employed was 1.1.

Benzyl disulfide reacts with sodium monosulfide according to the following reaction:

$$BzSSBz + NaSNa = 2\ BzSN + S$$

The effective sulfur content or "rank" of sulfur in the polysulfide reagent or solution is determined by dividing the number of atoms of sulfur in the benzyl disulfide and alkaline monosulfide by the number of mols of those reactants.

Therefore to get a particular rank, (e. g., 1.1 as used in the following example) the following ratio is used:

$$\frac{2x+y}{x+y} = 1.1$$

where $x$ equals the number of mols of benzyl disulfide and $y$ equals the number of mols of sodium monosulfide. Solving the equation it follows that $$2x + y = 1.1x + 1.1y$$

or $$0.9x - 0.1y = 0$$

or $$9x = y$$

Selecting a definite molar quantity of benzyl disulfide, e. g., 1 mol, then $x=1$ and $y=9$ and those molar quantities react as follows:

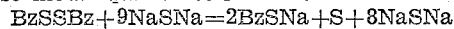
$$BzSSBz + 9NaSNa = 2BzSNa + S + 8NaSNa$$

Since there are 11 atoms of sulfur in the reactants as shown in the equation, and since there are 10 mols of reactants (1 mol $BzSSBz + 9NaSNa$) the rank of sulfur in the reaction as shown by the above equation is $11/10 = 1.1$.

18 gram atoms of an alkali metal or its equivalent, e. g., sodium, in an alkaline polysulfide react quantitatively with 9 mols of an organic dihalide without any excess of polysulfide over the dihalide. In the above reaction it will be observed that there are 18 gram atoms of Na in the products. However, since in accordance with the present invention the polysulfide must be in molar excess in relation to the organic dihalide, it is necessary to add, or otherwise have present, an amount of previously prepared alkaline polysulfide reagent necessary to produce the desired excess which in this particular Example 2 is expressed by a molar ratio of 1.05 mols of polysulfide to 1.00 mol of the organic reactants (assuming the use of 9.5 mols of organic reactants). Therefore, in the present example the desired excess is provided by the use of 0.5 mols of $Na_2S_{1.1}$ more than required by the halide. Instead of the excess of alkaline polysulfide expressed as a molar ratio of 1.05 alkaline polysulfide to 1.00 organic dihalides, the said excess may vary as previously stated within the range of 1.02 to 1.1—expressed as a molar ratio of the said alkaline polysulfide to organic disulfides.

Since .95 mol of chain stopper material illustrated in the present Example 2 by benzyl disulfide is employed together with 8.55 mols of dihalides, the mol ratio of the dihalide compounds to organic monomeric disulfide is 9 to 1. That ratio may vary from as much as 10,000 to 1 to 9 to 1.

Specific details to illustrate the principles above set forth in the preamble to this Example 2 are provided as follows:

180 cc. of 50% $Mg_2Cl\ 6H_2O$, 750 cc. of water and 45 cc. of a 5% solution of a suitable wetting agent, for example, sodium alkylnaphthalene sulphonate and 48 cc. of 50% sodium hydroxide solution are mixed with adequate stirring. 1 mol, for example, 500 cc. of 2 molar, $Na_2S_2$ was added. To the resultant thickened emulsion was added 1.9 mols (237 g.) of benzylchloride (10% theoretical chain stopper) at an initial temperature of 150° F. The reaction was gradually heated up to 190° F., where it was held for 20 minutes. At this point the reaction mixture was almost white.

9 mols (4500 cc. of 2 molar) $Na_2S$ were added and the pale colored suspension gave the normal color of a polysulfide solution. This together with the 0.05 M. excess of $Na_2S_2$ above provides the 0.5 M. excess of $Na_2S_{1.1}$ necessary. This was heated to 150° F. and there was fed into it a mixture of 7.125 mols (75 mol per cent) of ethylene dichloride and 1.425 mols (15%) of triglycol dichloride. The addition required 60 minutes, during which time the temperature was kept below 170° F., to prevent loss of halides by vaporization. A smooth, almost white latex was obtained. This latex was heated to 190° F. rather slowly, where it was held for 60 minutes. Finally the latex was heated to boiling point and 450 cc. of distillate were removed. The distillation temperature was approximately 220° F. This latex was washed free of excess inorganic sulfides, using hot water and acidified in the cold with dilute sulfuric acid to pH 1. After acidification, the latex was washed free of acid, filtered and dried in a 110° C. oven. The resultant product was an amber, very soft wax-like material, having a melting point about 203° F. and a melt viscosity of about 260 cp. at about 240° F.

From what has been said it will be clear that in each of the above examples a mixture of any two or more specifically different dihalogenated compounds containing a halogen atom attached to each of two different methylene carbon atoms may be used (e. g., a mixture of any two or more of the compounds of Table II may be used it being noted that in Table II X indicates a halogen atom) provided that at least one of the components of the mixture is an alkylene dihalide and that the mol percent of the alkylene dihalide in the mixture lies within the range of 60 to 95.

Further illustrations are as follows:

Example 3

Proceed according to Example 1 using from 60 to 95 (e. g. 70 to 80) mol percent of ethylene dichloride and 40 to 5 (e. g. 30 to 20) mol percent of propylene dichloride.

Example 4

Proceed as in Example 2 using 70 to 80 mol percent of ethylene dichloride, 30 to 10 mol percent of triglycol dichloride and 1 to 10 mol percent of an organic monomeric disulfide.

Example 5

Proceed as in Example 2 using 70 to 80 mol per cent of ethylene dichloride, 30 to 10 mol percent of di(2 chloroethyl) formal and 1 to 10 mol percent of a monomeric organic disulfide.

Example 6

Proceed as in Example 2 using 70 to 80 mol per cent of ethylene dichloride, 30 to 10 mol percent of glycerol dichlorhydrin and 1 to 10 mol percent of an organic monomeric disulfide.

The molecular proportions of organic dihalides, where no chain stopper is used, or organic dihalides plus organic monomeric disulfides (used to obtain the chain limiting or "stopper" effect), add up to 100 per cent.

In the explanation given in connection with Table I it was pointed out that the organic compounds containing only one negative substituent capable of being split off by reaction with the alkaline sulfide e. g., halogen, etc. converted into the corresponding di- or polysulfides by reaction with an alkaline di- or polysulfide (or into the corresponding mercaptides e. g. by reaction with alkaline hydrosulfides. However, instead of forming said organic monomeric disulfides or mercaptides in situ they may be previously formed from which it follows that in that event organic monomeric disulfides in general may be employed. The generality thereof will be apparent when it is realized that they may be formed by reacting the compounds illustrated in Table I and generically described in the paragraph preceding Table I, with an alkaline disulfide. Instead of the said disulfides, organic monomeric mercaptides in general may be employed and the generality thereof may be indicated by substituting X in the formulae of Table I the group SM where M is an alkali metal or ammonium.

We claim:

1. Process which comprises reacting an alkaline polysulfide reagent containing a mercaptide chain stopper and constituting a polysulfide reagent corresponding in effective sulfur content to an alkaline polysulfide having the formula $$M_2S_{1.05-1.13}$$

where M is a cation of the group consisting of ammonium and alkali metals and S is sulfur, with a mixture of dihalogenated compounds each of which has one halogen atom connected to each of two different methylene carbon atoms at least one of said dihalogenated compounds being an alkylene dihalide said dihalogenated compounds having the general formula XRX where R is a divalent radical of the group consisting of aliphatic hydrocarbon, oxahydrocarbon and thiahydrocarbon radicals and araliphatic radicals in which the aromatic portion is hydrocarbon and in which the aliphatic portions are selected from the group consisting of hydrocarbon and oxahydrocarbon radicals, the mol per cent of the alkylene dihalide in the mixture varying from 60 to 95, the mol ratio of alkaline polysulfide to the organic reactants lying within the range of 1.02 to 1.10.

2. Process which comprises reacting the reaction product of $x$ mols of an organic monomeric disulfide and $y$ mols of an alkaline monosulfide where $$\frac{2x+y}{x+y}=1.05 \text{ to } 1.13$$

said reaction product containing a mercaptide and an alkaline polysulfide and constituting a polysulfide reagent corresponding empirically in effective sulfur content to an alkaline polysulfide having the formula $M_2S_{1.05 \text{ to } 1.13}$ where M is a cation of the group consisting of ammonium and alkali metals and S is sulfur, with a mixture of dihalogenated compounds, each of which has one halogen atom connected to each of two different methylene carbon atoms at least one of said dihalogenated compounds being an alkylene dihalide said dihalogenated compounds having the general formula XRX where R is a divalent radical of the group consisting of aliphatic hydrocarbon, oxahydrocarbon and thiahydrocarbon radicals and araliphatic radicals in which the aromatic portion is hydrocarbon and in which the aliphatic portions are selected from the group consisting of hydrocarbon and oxahydrocarbon radicals the mol per cent of the alkylene dihalide in the mixture varying from 60 to 95, the mol ratio of said dihalogenated compounds to said organic monomeric disulfide lying within the range of 10,000 to 1 to 9 to 1, the mol ratio of said polysulfide reagent to the organic reactants lying within the range of 1.02 to 1.10.

3. Process according to claim 1 in which the mixture of dihalogenated compounds is composed of 70 to 80 mol per cent of ethylene dichloride and 30 to 20 mol per cent of propylene dichloride.

4. Process according to claim 2 in which the mixture of dihalogenated compounds is composed of 70 to 80 mol per cent of ethylene dichloride and 30 to 10 mol per cent of triglycol dichloride and in which the organic monomeric disulfide is used in the proportion of 1 to 10 mol per cent, the sum of the mol per cents of the dihalogenated compounds and organic monomeric disulfides being equal to 100.

5. Process according to claim 2 in which the mixture of dihalogenated compounds is composed of 70 to 80 mol per cent of ethylene dichloride and 30 to 10 mol per cent of di (2 chloroethyl) formal and in which the organic monomeric disulfide is used in the proportion of 1 to 10 mol per cent, the sum of the mol per cents of the dihalogenated compounds and organic monomeric disulfides being equal to 100.

6. Process according to claim 2 in which the mixture of dihalogenated compounds is composed of 70 to 80 mol per cent of ethylene dichloride, 30 to 10 mol per cent glycerol dichlorohydrin and in which the organic monomeric disulfide is used in the ratio of 1 to 10 mol per cent, the sum of the mol per cents of the dihalogenated compounds and organic monomeric disulfides being equal to 100.

7. A wax-like copolymer made according to the process of claim 1.

8. A wax-like copolymer made according to the process of claim 2.

9. A wax-like copolymer made according to the process of claim 3.

10. A wax-like copolymer made according to the process of claim 4.

11. A wax-like copolymer made according to the process of claim 5.

12. A wax-like copolymer made according to the process of claim 6.

JOSEPH C. PATRICK.
FRANKLIN O. DAVIS.

REFERENCES CITED

The following references are of record in the file of this patent:

UNITED STATES PATENTS

| Number | Name | Date |
|---|---|---|
| 1,890,191 | Patrick | Dec. 2, 1932 |
| 1,923,392 | Patrick | Aug. 22, 1933 |
| 2,216,044 | Patrick | Sept. 24, 1940 |
| 2,273,471 | Kimball | Feb. 17, 1942 |
| 2,392,402 | Patrick | Jan. 8, 1946 |
| 2,406,260 | Ryden | Aug. 20, 1946 |
| 2,411,275 | Kinneberg et al. | Nov. 19, 1946 |

FOREIGN PATENTS

| Number | Country | Date |
|---|---|---|
| 136,287 | Switzerland | Jan. 2, 1930 |